C. B. LIVERS
INVENTOR.

BY *[signature]*

ATTORNEY

July 16, 1957

C. B. LIVERS 2,799,250

FOLLOW-UP MECHANISM FOR HYDRAULIC MOTOR VALVE

Filed May 27, 1952

C. B. LIVERS
INVENTOR.

BY

ATTORNEY

United States Patent Office 2,799,250
Patented July 16, 1957

2,799,250

FOLLOW-UP MECHANISM FOR HYDRAULIC MOTOR VALVE

Carlos B. Livers, North Hollywood, Calif., assignor to Bendix Aviation Corporation, North Hollywood, Calif., a corporation of Delaware Application May 27, 1952, Serial No. 290,253

6 Claims. (Cl. 121—41)

This invention relates to hydraulic motor and valve constructions having follow-up control for automatically stopping the motor after it has moved a distance corresponding to the movement of a primary control member.

An object of the invention is to provide a simple, reliable and inexpensive valve-actuating mechanism for differentially controlling a hydraulic motor valve in accordance with the positions of a primary control member and of the motor respectively.

Other more specific objects and features of the invention will appear from the description to follow.

In the drawing:

Fig. 3 is a longitudinal vertical sectional view taken in the plane III—III of Fig. 2;

Fig. 4 is a detail section taken in the plane IV—IV of Fig. 3; and

Fig. 5 is a detail section in the plane V—V of Fig. 3.

Figure 1:
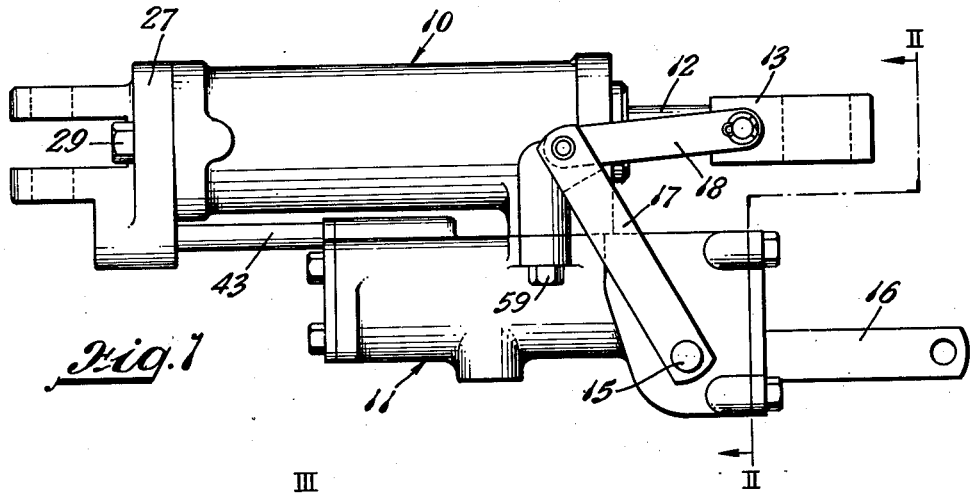
Fig. 1 is a side elevational view of a motor and valve assembly in accordance with the invention.

Referring to Fig. 1, the motor and valve assembly therein disclosed comprises a motor unit 10 and a valve unit 11 secured together as by cap screws 59, only one of which appears in Fig. 1. The motor contains a piston connected to a piston rod 12 which extends from the right end of the motor unit and has connected thereto at its outer end a suitable fitting 13 whereby it can be connected to a device to be actuated.

Figure 2:
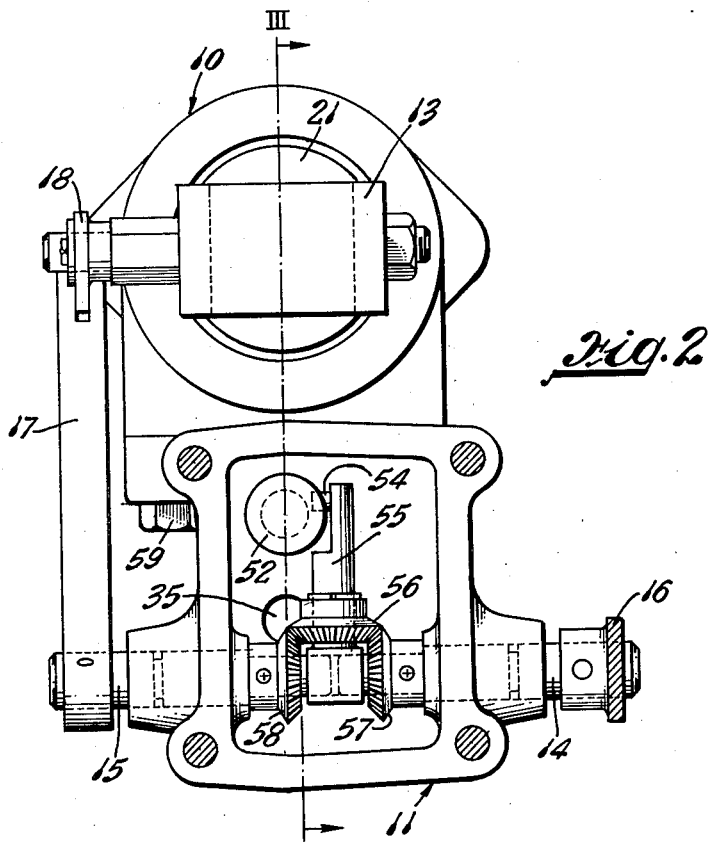
Fig. 2 is an end elevational view partly in section, the section being taken along the line II—II of Fig. 1.

Referring to Fig. 2, the valve unit 11 has two co-axial control shafts 14 and 15 respectively extending from opposite sides of the unit. The first shaft 14 has an arm 16 secured thereto which constitutes a primary control member and may be actuated by hand. The second shaft 15 has connected thereto an arm 17, the upper end of which (Fig. 1) is connected by a link 18 to the fitting 13 on the piston rod 12, so that the control shaft 15 is oscillated by the piston rod 12.

Referring to Fig. 3, the motor unit 10 comprises a cylinder 19 containing the piston 20 to which the piston rod 12 is attached. The right end of the cylinder 19 is closed by a plug 21 retained in position by a spring retaining ring 22. The plug 21 is provided with a suitable sealing ring 23 and has an inner aligning extension containing longitudinal grooves 24 communicating at the right end with an annular groove 25 which communicates with a passage 26 for the inflow and outflow of fluid, this passage 26 constituting one of the motor ports. The left end of the cylinder 19 is closed by an end cap 27 having a sealing ring 28 and secured in place as by cap screws 29 (Fig. 1). The cap 27 contains a motor port or a fluid passage 28' for the inflow and outflow of fluid from the left end of the cylinder.

The valve unit 11 defines a valve cylinder 30 having motor ports 31 and 32 and a return port 33 at its left end. The right end of the valve cylinder 30 is in open communication with a chamber 34, and both the chamber 34 and the port 33 are communicated by a passage 35 with a main return port 36. Thus it will be seen that the same pressure exists at all times in the right end of valve cylinder 30 as exists in left chamber 34 by virtue of the aforementioned communication through passage 35 which is in communication with the main return port 36. A pressure port 38 (Fig. 4) communicates with the valve cylinder 30 intermediate its ends.

The motor port 26 of the motor unit is aligned with and communicates directly with the motor port 32 of the valve unit, a sealing ring 40 providing a fluid tight connection between the two units. The motor port 31 of the valve unit is communicated by a passage 42 in the valve unit, a connecting pipe 43, and a passage 44 in the motor unit with the motor port 28' therein. The pipe 43 has a reduced right end which extends into the passage 42 and seals therewith with a sealing ring 45. The left end of the pipe 43 extends into the passage 44 in the motor unit and is sealed with respect thereto by a sealing ring 47. The pipe 43 is urged to the right into abutting relation against the valve unit by hydraulic pressure because the left hand end is larger in diameter than the right hand end. Since both ends are subjected to approximately the same pressure, the thrust resulting from the unequal areas is preponderantly toward the right, thus preventing movement of pipe 43 regardless of the direction of the fluid flow within it.

It is sometimes desirable to limit the speed of the piston 20 in one direction relative to the other. This may be done by a poppet valve 50 reciprocable in the passage 44 and normally urged into seating relation against the end of the pipe 43 by a light helical spring 49 compressed between the valve 50 and the end of passage 44. The valve 50 is square in cross-section, as shown in Fig. 5, to permit fluid flow therepast, and has a small orifice 50a extending therethrough. During movement of the motor piston 20 to the left its speed is restricted by the resistance to fluid flow through the orifice 50a. During reverse flow, the valve 50 lifts away from the end of pipe 43, and the resistance to flow is much less.

There is positioned in the valve cylinder 30 for reciprocation therein a valve member 52, this member having lands 52a and 52b which are normally juxtaposed to and block the motor ports 31 and 32 respectively, and isolate the pressure port 38 from the return port 33 and the chamber 34. It will be observed that the fluid pressure between the opposite inner equal area faces of the lands 52a and 52b is always the pressure at port 38, and the force of fluid pressure on these inner faces virtually balances out any tendency of the pressure fluid to cause the valve member to move in either direction. The right end of the valve member 52 extends into the chamber 34 and is provided with an annular groove 52c which is engaged by a pin 54 on an arm 55 which constitutes a bearing member for a gear 56. The arm 55 is pivotally supported at its lower end on the inner ends of the control shafts 14 and 15 (Fig. 2).

Secured to the inner ends of the shafts 14 and 15 within the valve unit are two gears 57 and 58 respectively, which mesh with the gear 56. It will be apparent therefore that rotation of either of the gears 57 or 58 rotates the gear 56 and oscillates the arm 55 around the axis of the shafts 14 and 15, to shift the valve member 52 in one direction or the other.

The assembly functions as follows:

Referring to Fig. 3, the valve member 52 is shown in neutral position, in which the pressure port 38 is isolated from both the motor ports 31 and 32 and from the return passage 35. The force of fluid pressure on the inner faces of lands 52a and 52b is neutralized or balanced out. Let it be assumed now that the motor piston 20 is to be moved a predetermined distance to the right, This is effected by rocking the primary control arm 16 counterclockwise through a predetermined angle. This rocks the gear 57 counterclockwise as viewed in Fig. 3 and rotates the gear 56 on the arm 55, and at the same time causes it to rock about the axis of the shafts 14 and 15 to shift the valve member 52 to the left thereby connecting the pressure port 38 with the motor port 31 and connecting the motor port 32 through the right end of the valve cylinder 30, the chamber 34 and the passage 35 to the return port 36, whereupon fluid is admitted to the left end of the motor cylinder 19 and exhausted from the right end thereof to move the piston 20 to the right. With this flow of fluid from chamber 34 through passage 35, it will be noted, that the return fluid pressure will also exist on the left end of the valve member 52, and thus the valve member 52 having return pressure fluid on each of its outer ends and pressure fluid balanced out on the inner faces of the control lands 52a and 52b is an essentially balanced condition which permits the minimum of resistance to movement during manual actuation and automatic return of the control mechanism. The corresponding movement of the piston rod 12 and the fitting 13 shifts the link 18 (Fig. 1) to the right, rocking the arm 17 and the shaft 15 clockwise. This rocks the gear 58 clockwise, which is opposite to the direction in which the gear 57 was rocked by the primary control arm 16. Therefore the movement of the piston and the piston rod 12 in response to the movement of the primary control arm 16 rocks the gear 56 and the arm 55 in direction to restore the valve member 52 to neutral position, and it will attain this neutral position when the motor piston 20 has traveled a distance corresponding to the initial movement of the primary control arm 16, at which time the motor piston 20 will be stopped in a new position.

The same action takes place when the primary control arm is rocked in clockwise direction, except that the valve member 52 is then shifted to the right to admit pressure from the port 38 to the motor port 26 and connect the motor port 28′ to return to move the motor piston 20 to the left.

It will be observed that the possible range of movement of the valve member 52 out of neutral position is relatively great so that the control arm 16 can be immediately moved into a new position corresponding to the desired new position of the motor piston 20, without waiting for the motor piston to complete its action.

Although for the purpose of explaining the invention, a particular embodiment thereof has been shown and described, obvious modifications will occur to a person skilled in the art, and I do not desire to be limited to the exact details shown and described.

I claim:

1. In a device of the class described and in combination with a controlled double acting fluid motor, an automatic follow-up fluid control valve means for actuating said motor including a valve housing, means providing a valve bore longitudinally disposed in said housing, a fluid outlet passage to said valve bore in said housing, a fluid outlet port in said housing in communication with said fluid outlet passage, a slide valve member reciprocable in said valve bore, means in said housing communicating the fluid outlet passage with the ends of the slide valve member, the slide valve member including two annular spaced land members, said land members and valve bore providing a fluid pressure chamber contained between said land members, a fluid pressure inlet port in said housing in communication with the aforementioned fluid chamber, the sides of the land members opposite said pressure chamber cooperating with said housing forming two opposed low pressure fluid return chambers to which the aforesaid fluid outlet passage is in communication, the slide valve member including an extending portion located in one of said low pressure chambers, two axially aligned rotatable shaft members supported by said housing transverse to the longitudinal axis of said slide valve member and spaced from the extending portion of said slide valve member in said low pressure chamber, said shaft members including spaced adjacent ends located in the last mentioned low pressure chamber, the opposite ends of said shaft members protruding from said housing, co-axial bevel gear members secured to each spaced adjacent end of said shafts and rotatable therewith in the low pressure chamber, a shaft member pivotally supported on the adjacent ends of said shaft, one end being engageable with the extending portion of the slide valve member, a planetary gear member rotatably supported on the last mentioned shaft member and intermeshed with said bevel gears for providing a differential gear action the valve housing including two work ports normally controlled by the annular land members on the slide valve member for communicating with the respective ends of the controlled fluid motor for alternatively conducting either inlet or outlet fluid pressure to the respective ends thereof for actuating a power piston contained therein depending on the direction of desired actuation of the fluid motor, a manually adjustable control lever secured to and rotatable with one of the shafts protruding from said valve housing for rotating said shaft and moving said valve member in its valve bore in a first direction, and linkage means rotatable with the end of the other shaft protruding from said valve housing, said linkage means being arranged to be connected to the piston rod of the control fluid motor wherein movement of said control lever causes displacement of said slide valve in the aforementioned first direction and permits inlet pressure fluid to be directed to one end of said fluid motor through one work port and actuation of the piston contained therein, and permits outlet fluid to be directed through said other work port through the fluid outlet passage, into said low pressure chambers and out of said fluid outlet port, movement of said linkage means due to actuation of said controlled motor causing said slide valve member to move in a direction opposite to the aforementioned first direction resulting in the slide valve member returning to a neutral position due to the intermediary of said differential gearing.

2. A hydraulic control valve comprising: a body member having a gear chamber therein and a longitudinally extending valve chamber opening directly into said gear chamber; said longitudinally extending valve chamber having a pair of longitudinally spaced motor ports in the side walls thereof for flow into and out of said valve chamber; a movable valve member slidable in said valve chamber between one end position, an intermediate position, and an opposite end position; said body member having pressure passageways and exhaust passageways; said passageways, said motor ports, and said movable valve member being constructed and arranged to close off both of said motor ports when said movable valve member is in its intermediate position, communicate one of said motor ports with said pressure passages and said other motor port with the exhaust passages when in one end position, and communicate said other of said motor ports with said pressure passages and said one of said motor ports with said exhaust passageways when in its opposite end position; first and second coaxially positioned shafts extending through side walls of said gear chamber and positioned generally transversely to and spaced to one side of the axis of said valve chamber, said first shaft being provided with a gear in said gear chamber and an external manually operable hand lever, said second shaft being provided with a gear in said gear chamber and external means adapted to be actuated by a controlled device; a rock shaft supported for arcuate movement about said first and second shafts and extending generally toward the axis of said valve chamber, means connecting said rock shaft and said movable valve member for converting the arcuate movement of said rock shaft to sliding movement of said movable valve member; and a gear journalled on said rock shaft and in mesh with said other gears, whereby a change in position of the hand lever moves the movable valve member out of its intermediate position to an end position, and resulting movement of the controlled device moves the movable valve member back to its intermediate position.

3. A hydraulic control valve comprising: a body member having a gear chamber therein and a cylindrical bore opening into said gear chamber; said cylindrical bore having a pair of axially spaced motor ports in the side walls thereof for flow into and out of said bore; a spool valve member one end of which is positioned in said gear chamber and the other end of which extends into said bore, and slidable between one end position, an intermediate position, and an opposite end position; said spool valve member having land portions in substantial sealing engagement with the side walls of said bore to provide a valve pressure chamber intermediate said land portions, and exhaust chamber to one side of one of said lands and communicating with said gear chamber, and another exhaust chamber to the other side of the other of said lands; said body member having a pressure connection communicating with said pressure chamber, and an exhaust connection communicating with said exhaust chambers; said spool valve being constructed and arranged to close off both of said ports when in its intermediate position, communicate said one of said ports with the pressure chamber and said other port with an exhaust chamber when in said one end position, and communicate said other of said ports with the pressure chamber and said one of said ports to an exhaust chamber when in said opposite end position; first and second coaxially positioned shafts extending through the side walls of said gear chamber and positioned generally transversely to and spaced to one side of the axis of said valve chamber, said first shaft being provided with a gear in said gear chamber and an external manually operable hand lever, said second shaft being provided with a gear in said gear chamber and external means adapted to be actuated by a controlled device; a rock shaft supported for arcuate movement in said gear chamber about said first and second shafts and extending generally toward the axis of said spool valve member; means connecting said rock shaft and said spool valve member for converting the arcuate movement of said rock shaft to sliding movement of said spool valve member; and a gear journalled on said rock shaft and in mesh with said other gears, whereby a change in position of the hand lever moves the spool valve out of its intermediate position to an end position, and resulting movement of the controlled device moves the spool valve back to its intermediate position.

4. A hydraulic control valve comprising: a body member having a gear chamber therein and a cylindrical bore opening into said gear chamber; said cylindrical bore having a pair of axially spaced motor ports in the side walls thereof for flow into and out of said bore; a spool valve member one end of which is positioned in said gear chamber and the other end of which extends into said bore, and slidable between one end position, an intermediate position, and an opposite end position; said spool valve member having land portions in substantial sealing engagement with the side walls of said bore to provide a valve pressure chamber intermediate said land portions, and exhaust chamber to one side of one of said lands and communicating with said gear chamber, and another exhaust chamber to the other side of the other of said lands; said body member having a pressure connection communicating with said pressure chamber, and an exhaust connection communicating with said exhaust chambers; said spool valve being constructed and arranged to close off both of said ports when in its intermediate position, communicate said one of said ports with the pressure chamber and said other port with an exhaust chamber when in said one end position, and communicate said other of said ports with the pressure chamber and said one of said ports to an exhaust chamber when in said opposite end position; first and second coaxially positioned shafts extending through opposite side walls of said gear chamber and positioned generally transversely to and spaced to one side of said valve chamber, said first shaft being provided with a gear in said gear chamber and an external manually operable hand lever, said second shaft being provided with a gear in said gear chamber and external means adapted to be actuated by a controlled device; a rock shaft journalled about said first and second shafts and extending generally toward the axis of said spool valve member; slot and pin means connecting said rock shaft and said spool valve member for converting the arcuate movement of said rock shaft to sliding movement of said spool valve member; and a gear journalled on said rock shaft and in mesh with said other gears, whereby a change in position of the hand lever moves the spool valve out of its intermediate position to an end position, and resulting movement of the controlled device moves the spool valve back to its intermediate position.

5. A hydraulic control valve comprising: a body member having a gear chamber therein and a cylindrical bore opening into said gear chamber; said cylindrical bore having a pair of axially spaced motor ports in the side walls thereof for flow into and out of said bore; a spool valve member one end of which is positioned in said gear chamber and the other end of which extends into said bore, and slidable between one end position, and intermediate position, and an opposite end position; said spool valve member having land portions in substantial sealing engagement with the side walls of said bore to provide a valve pressure chamber intermediate said land portions, an exhaust chamber to one side of one of said lands opening into said gear chamber, and another exhaust chamber to the other side of the other of said lands; said body member having a pressure connection communicating with said pressure chamber, and an exhaust connection communicating with said gear chamber and said other exhaust chamber; said spool valve being constructed and arranged to close off both of said ports when in its intermediate position, communicate said one of said ports with the pressure chamber and said other port with an exhaust chamber when in said one end position, and communicate said other of said ports with the pressure chamber and said one of said ports to an exhaust chamber when in said opposite end position; first and second coaxially positioned shafts extending through side walls of said gear chamber laterally removed from and positioned substantially transversely to said spool valve member, said first shaft being provided with an external manually operable hand lever and a gear inside said gear chamber; said second shaft being provided with external means adapted to be actuated by a controlled device and a gear inside said chamber; a rock shaft supported for arcuate movement about the axis of said shafts and having a gear in mesh with said other gears; and slot and pin means connecting said rock shaft and said spool valve member for converting the arcuate movement of said rock shaft to sliding movement of said spool valve member.

6. A hydraulic control valve comprising: a housing having a pressure port, a motor port and an exhaust port, and including an internal gear chamber communicating with said exhaust port; slide valve means having a movable slide one end of which projects into said gear chamber for causing flow from said pressure port to proceed out said motor port when in one end position, to cause flow from said motor port to proceed out said exhaust port when in an opposite end position, and to cause substantially no flow to proceed either in or out said motor port when in an intermediate position; first and second coaxially positioned shafts extending through the side walls of said gear chamber, said shafts being laterally removed from and positioned substantially transversely to said movable slide; said first shaft being provided with a gear in said chamber and an external manually operable hand lever; said second shaft being provided with a gear in said chamber facing said other gear, and external means adapted to be actuated by a controlled device; a rock shaft supported for arcuate movement about the axis of said first and second shafts and having a gear in mesh with said other gears; and means connecting said rock shaft and said end of said slide for converting the arcuate movement of said rock shaft to sliding movement of said movable slide.

References Cited in the file of this patent

UNITED STATES PATENTS

| | | |
|---|---|---|
| 1,729,173 | Marfaing | Sept. 24, 1929 |
| 1,987,505 | Edler | Jan. 8, 1935 |
| 2,111,594 | Kuzelewski | Mar. 22, 1938 |
| 2,166,206 | Benson | July 18, 1939 |
| 2,345,837 | Smith | Apr. 4, 1944 |
| 2,401,378 | Smith | June 4, 1946 |
| 2,404,552 | Werff | July 23, 1946 |
| 2,572,902 | Ashton | Oct. 30, 1951 |
| 2,633,860 | Derrington | Apr. 7, 1953 |
| 2,637,259 | Acton | May 5, 1953 |
| 2,654,347 | Clark | Oct. 6, 1953 |
| 2,654,349 | Ziskal | Oct. 6, 1953 |

FOREIGN PATENTS

| | | |
|---|---|---|
| 959,222 | France | Sept. 26, 1949 |
| 632,513 | Great Britain | Nov. 28, 1949 |